(12) United States Patent
Weiler et al.

(10) Patent No.: US 7,832,045 B2
(45) Date of Patent: Nov. 16, 2010

(54) WINDSHIELD WIPING DEVICE FOR A MOTOR VEHICLE

(75) Inventors: Michael Weiler, Chungchongbuk-Do (KR); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 1217 days.

(21) Appl. No.: 10/563,046

(22) PCT Filed: Apr. 27, 2004

(86) PCT No.: PCT/DE2004/000880

§ 371 (c)(1),
(2), (4) Date: May 18, 2006

(87) PCT Pub. No.: WO2005/000644

PCT Pub. Date: Jan. 6, 2005

(65) Prior Publication Data
US 2006/0242782 A1 Nov. 2, 2006

(30) Foreign Application Priority Data
Jun. 30, 2003 (DE) ................. 103 29 574

(51) Int. Cl.
*B60S 1/06* (2006.01)
(52) U.S. Cl. ................ 15/250.31; 15/250.3; 296/96.15; 296/96.17; 403/220; 403/224; 403/DIG. 3

(58) Field of Classification Search .............. 15/250.31, 15/250.3, 250.27; 403/DIG. 3, 24, 291, 224, 403/220; 296/96.15, 96.17, 189
See application file for complete search history.

(56) References Cited

U.S. PATENT DOCUMENTS

| 5,609,329 A | * | 3/1997 | Scholl | ......................... 267/141 |
| 6,216,309 B1 | * | 4/2001 | Goto et al. | ................ 15/250.31 |
| 6,254,167 B1 | | 7/2001 | Goto et al. | |
| 6,532,616 B1 | * | 3/2003 | Eustache | .................. 15/250.31 |

FOREIGN PATENT DOCUMENTS

| EP | 1 040 972 | 10/2000 |
| JP | 11-139255 | 5/1999 |
| JP | 2001-080464 | 3/2001 |
| WO | 03/047926 A1 | 6/2003 |

\* cited by examiner

*Primary Examiner*—Gary K Graham
(74) *Attorney, Agent, or Firm*—Michael Best & Friedrich LLP

(57) ABSTRACT

Windshield wiper device (400) for a motor vehicle with at least one wiper bearing (42) and a fastening element (44) that is connected to a vehicle body, wherein a decoupling element (43) for decoupling noise is arranged between the at least one wiper bearing (42) and the fastening element (44), wherein the decoupling element (43) and/or the wiper bearing (42) is detachably connected to the fastening element (44).

10 Claims, 4 Drawing Sheets

WINDSHIELD WIPING DEVICE FOR A MOTOR VEHICLE

BACKGROUND OF THE INVENTION

The invention relates to a windshield wiper device for a motor vehicle with at least one wiper bearing and a fastening element that is connected to the vehicle body, wherein a decoupling element for decoupling noise is arranged between the at least one wiper bearing and the fastening element.

Pedestrians are completely unprotected in collisions with motor vehicles. In particular, the unyielding, hard parts beneath the engine hood often produce severe injuries when a pedestrian impacts a vehicle. The windshield wiper device is located in an area where pedestrians frequently hit a vehicle in an impact. The windshield wiper devices generally known from the prior art have the disadvantage that they represent a great danger of injury for a pedestrian in an impact with a vehicle.

SUMMARY OF THE INVENTION

The objective of the invention is improving a windshield wiper device of the type mentioned at the outset to the effect that in the future the danger of injury for a pedestrian in an impact with a vehicle is reduced.

The invention attains the stated objective via a windshield wiper device for a motor vehicle with at least one wiper bearing and a fastening element that is fastened to the vehicle body, wherein a decoupling element for decoupling noise is arranged between the at least one wiper bearing and the fastening element, wherein the decoupling element and/or the wiper bearing is detachably connected in accordance with the invention to the fastening element. Because of the detachable connection of the decoupling element and/or the wiper bearing to the fastening element, the decoupling element and/or the wiper bearing can detach from the fastening element by the impact of a pedestrian so that the decoupling element and/or the wiper bearing give way during an impact, and thereby reduce the pedestrian's risk of injury in an impact with the windshield wiper device.

In one development of the invention, the fastening element and/or the decoupling element are provided with an undercut, wherein the fastening element and/or the decoupling element are manufactured of a deformable material. The undercut on the fastening element and/or on the decoupling element affects a lock of the decoupling element on the fastening element in an axial direction of a wiper bearing shaft. This lock is necessary to guarantee its proper functioning when the windshield wiper device is in operation. Because the fastening element and/or the decoupling element are manufactured of a deformable material, in the case of a pedestrian impact with the vehicle, the lock between the fastening element and the decoupling element can be detached despite the undercut. As a result, the decoupling element and/or the wiper bearing yields to the impact. Consequently, the pedestrian's risk of injury is reduced considerably.

The undercut can be realized structurally very simply by a material projection in the end area of the fastening element. This material projection can be embodied advantageously as a thickening. The required impact force that must prevail in order to detach the decoupling element from the fastening element is defined as a function of the size of thickening.

In order to be able to dissipate the impact energy uniformly and not jerkily, the material projection in the end area of the fastening element can feature several teeth arranged one after the other. If the pedestrian impacts the windshield wiper device in accordance with the invention, the decoupling element is displaced over the successively arranged teeth by the impact, which teeth during displacement of the decoupling element generate a relatively high frictional force opposing the impact force. As a result, the impact energy is converted to thermal energy and thereby dissipated.

In another embodiment of the invention, the undercut can have a hook-shaped end area of the decoupling element. In an impact, the wiper bearing can press against the decoupling element on this hook-shaped end area so that in an impact the wiper bearing together with the decoupling element is displaced along the wiper bearing shaft and thereby detached from the fastening element.

In order to be able to better define the force required to detach the lock between the decoupling element and the fastening element, a disk can be arranged between the material projection in the end area of the fastening element and the hook-shaped end area of the decoupling element. For this reason, it is also possible that the undercut on the fastening element feature a diagonal bearing surface on which the disk or the decoupling element rests. The force to detach the decoupling element from the fastening element can be defined as a function of the angle of this diagonal bearing surface.

Expediently, there is a displacement path between a wiper arm and the fastening element in case of an impact with the windshield wiper device.

For reasons of optimal deformability during impact, the decoupling element can be manufactured of a plastic, in particular an elastomer. For the same reason, it is also possible to manufacture the fastening element of a plastic. Also for reasons related to easy manufacturability of the relatively complicated form of the decoupling element and the fastening element, it is meaningful if the decoupling element and the fastening element are manufactured of a plastic.

In order to achieve cost savings with high unit numbers, and in order to optimize process control in the case of a highly automated manufacturing concept, it is advantageous if the at least one wiper bearing and/or fastening element and/or the decoupling element are standardized non-variable parts.

BRIEF DESCRIPTION OF THE DRAWINGS

Various exemplary embodiments of a windshield wiper device in accordance with the invention are explained in greater detail on the basis of the enclosed drawings.

In detail the drawings show.

DETAILED DESCRIPTION

Figure 1:
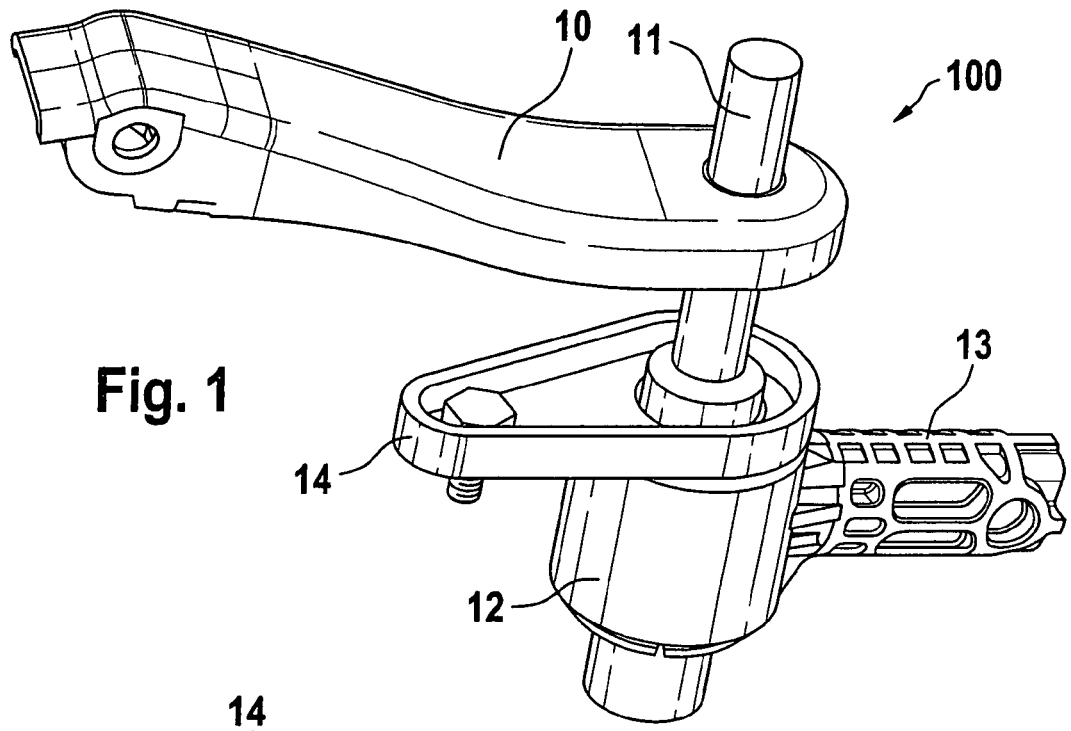
FIG. 1 A perspective top view of a windshield wiper device in accordance with the invention.
Figure 2:
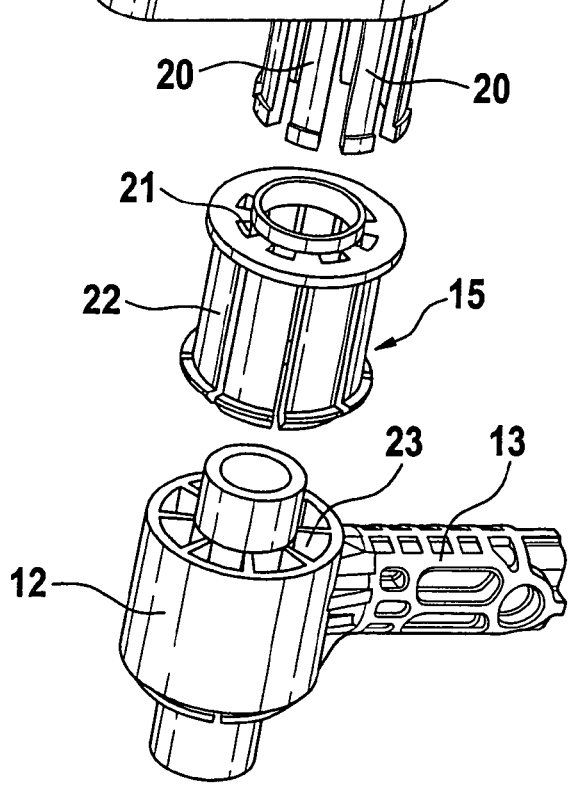
FIG. 2 An exploded view of the windshield wiper device from FIG. 1.
Figure 3A:
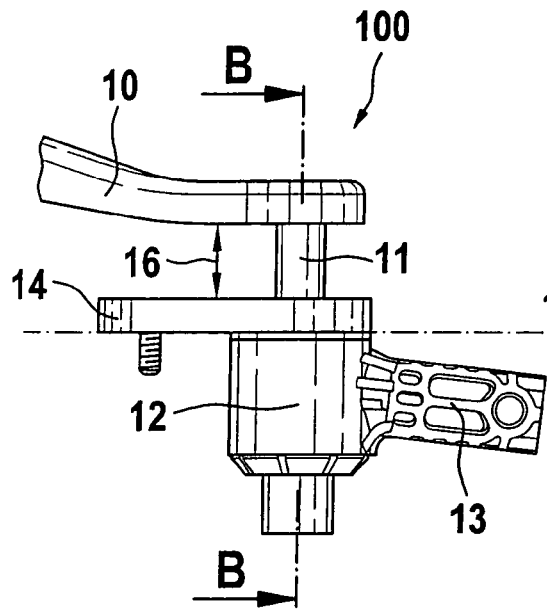
FIG. 3a A side view of the windshield wiper device from FIG. 1 before an impact with a pedestrian.
Figure 3B:
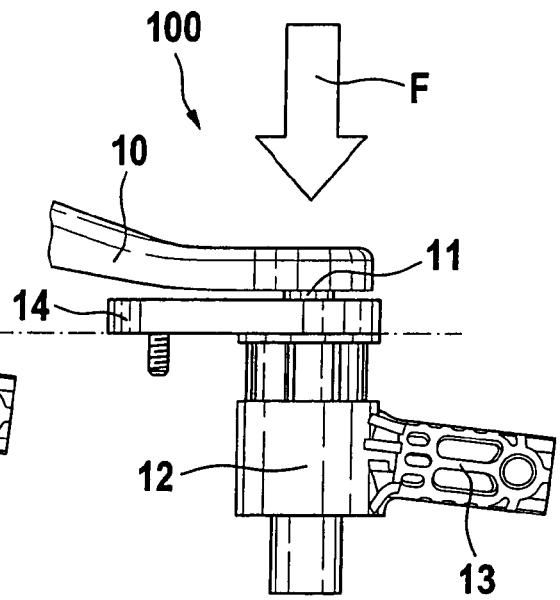
FIG. 3b A side view of the windshield wiper device from FIG. 1 after an impact with a pedestrian.

FIGS. 1, 2, 3a and 3b show a windshield wiper device 100 with a wiper arm 10, which is connected to a wiper bearing 12 by means of a wiper bearing shaft 11. A crimp peg 13 to accommodate a mounting plate tube (not shown here) is arranged on the wiper bearing 12. A fastening element 14 is attached above the wiper bearing 12 and this fastening element can be used to fasten the windshield wiper device 100 in accordance with the invention to a vehicle body (also not shown here). A decoupling element 15 to decouple noise is provided between the fastening element 14 that is fastened to the vehicle body and the wiper bearing 12. The decoupling element 15 is inserted axially into the wiper bearing 12 during assembly. The fastening element 14 is also inserted axially into the decoupling element 15 (see FIG. 2). As depicted in FIG. 2, the fastening element 14 has connecting pieces 20, which can be inserted into the openings 21 in the decoupling element 15 during assembly. The decoupling element 15 has connecting pieces 22, which can be inserted into openings 23 in the wiper bearing. Since the decoupling element 15 and the wiper bearing 12 are detachably connected to the fastening element 14, the wiper arm 10 can be pressed downward by a displacement path 15 via impact force F.

Figure 4:
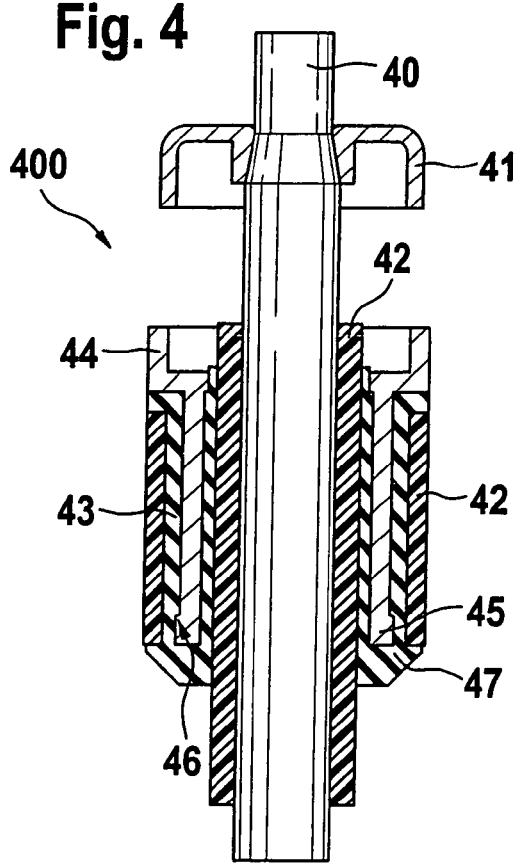
FIG. 4 A sectional view through the windshield wiper device from FIG. 3a along Line B-B.

FIG. 4 shows a windshield wiper device 400 with a wiper shaft 40, on which a wiper arm 41 is attached. The wiper shaft 40 is positioned in a wiper bearing 42. A decoupling element 43 is mounted on the wiper bearing 42 and a fastening element 44 is arranged on the decoupling element 43. The fastening element 44 features a thickening 45, around which a correspondingly formed undercut 46 on the decoupling element 43 grips. As a result, the undercut 46 and the thickening 45 form a lock of the decoupling element 43 with the fastening element 44. This lock is a function of how strongly the thickening 45 and the undercut 46 are embodied. Furthermore, the decoupling element 43 features a hook-shaped end area 47. The wiper bearing 42 is supported on this hook-shaped end area 47 during an impact. As a result, the wiper bearing 42 can displace the decoupling element 43 downward during an impact. During the downward displacement of the decoupling element 43, the decoupling element 43 with its undercut 46 is pushed over the thickening 45. As a result, the thickening 45 and the undercut 46 determine a detachment force required in order to detach the lock formed by the thickening 45 and the undercut 46. Since the decoupling element is frequently manufactured of an elastomer, the force required to detach the lock between the thickening 45 and the undercut 46 is a function of not just their dimensions but also of the hardness of the elastomer.

Figure 5:
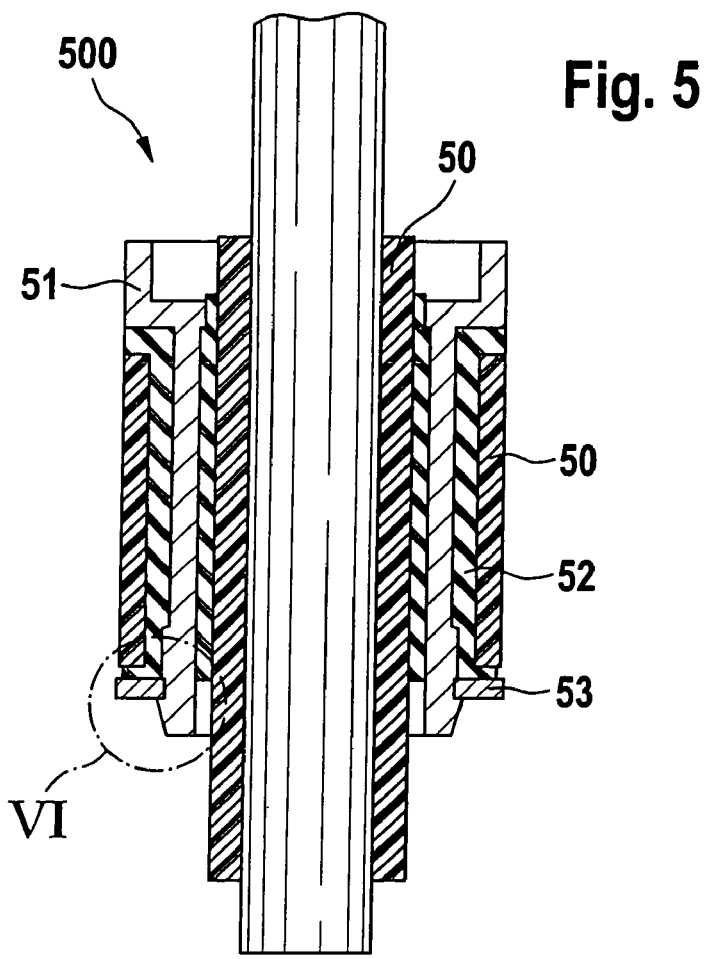
FIG. 5 A sectional view through a second embodiment of the windshield wiper device in accordance with the invention.
Figure 6:
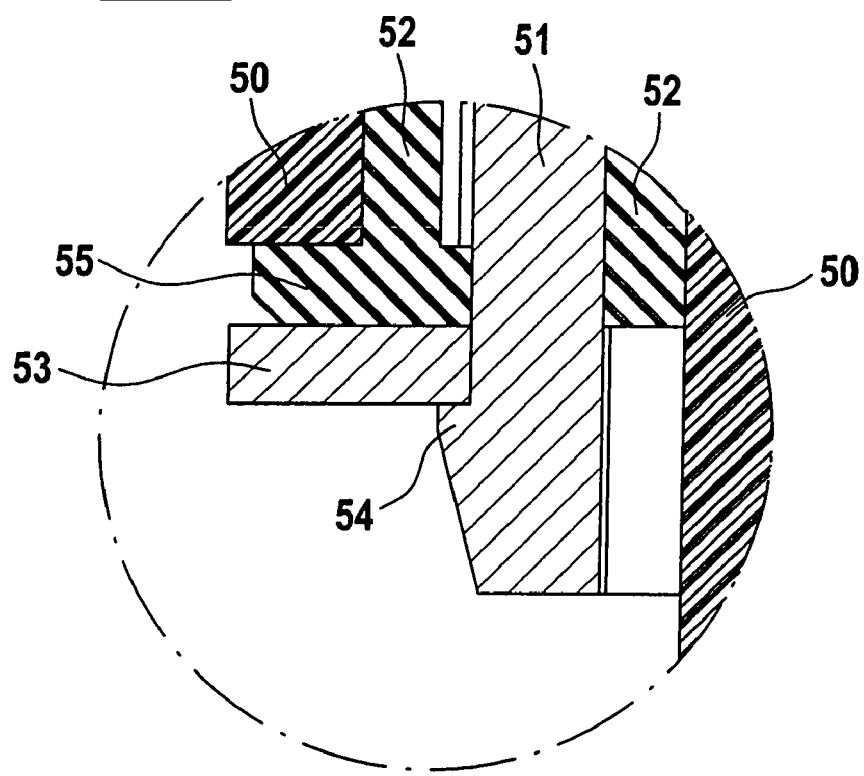
FIG. 6 A detailed view of a detail in the end area of a wiper bearing from FIG. 5.

FIGS. 5 and 6 show a windshield wiper device 500 with a wiper bearing 50, a fastening element 51 and a decoupling element 52. The decoupling element 52 includes a hook-shaped end area 55. A disk 53 is arranged between the fastening element 51 and the decoupling element 52. The disk 53 is locked in the upward axial direction by a thickening 54. In the case of an impact, the wiper bearing 50 together with the decoupling element 52 is pressed downward, whereby the disk 53 is pushed over the thickening 54, thereby detaching the lock.

Figure 7:
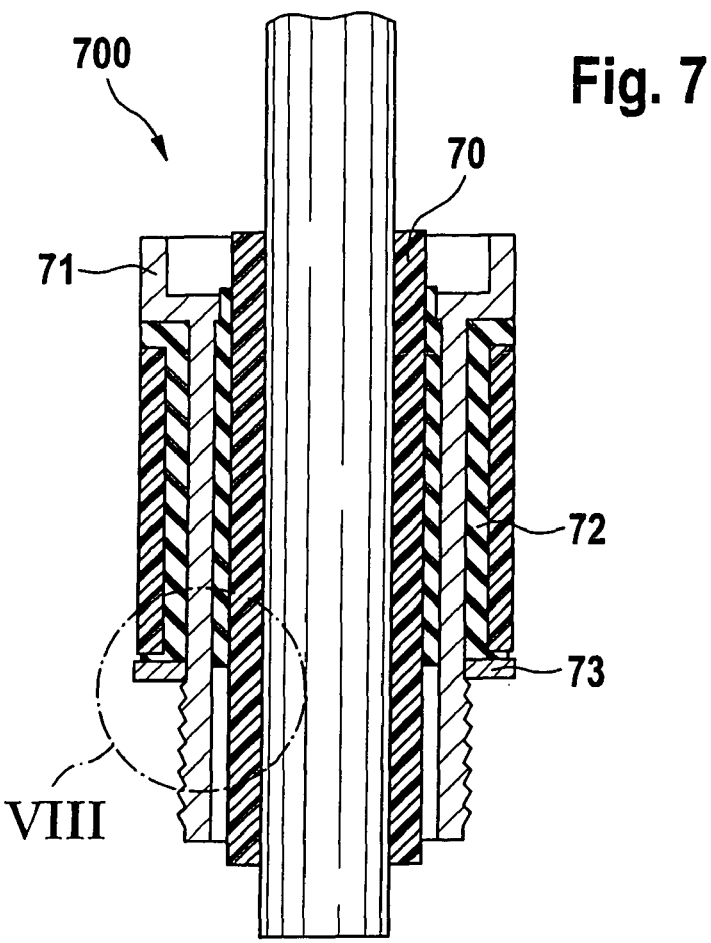
FIG. 7 A sectional view through a third embodiment of the windshield wiper device in accordance with the invention.
Figure 8:
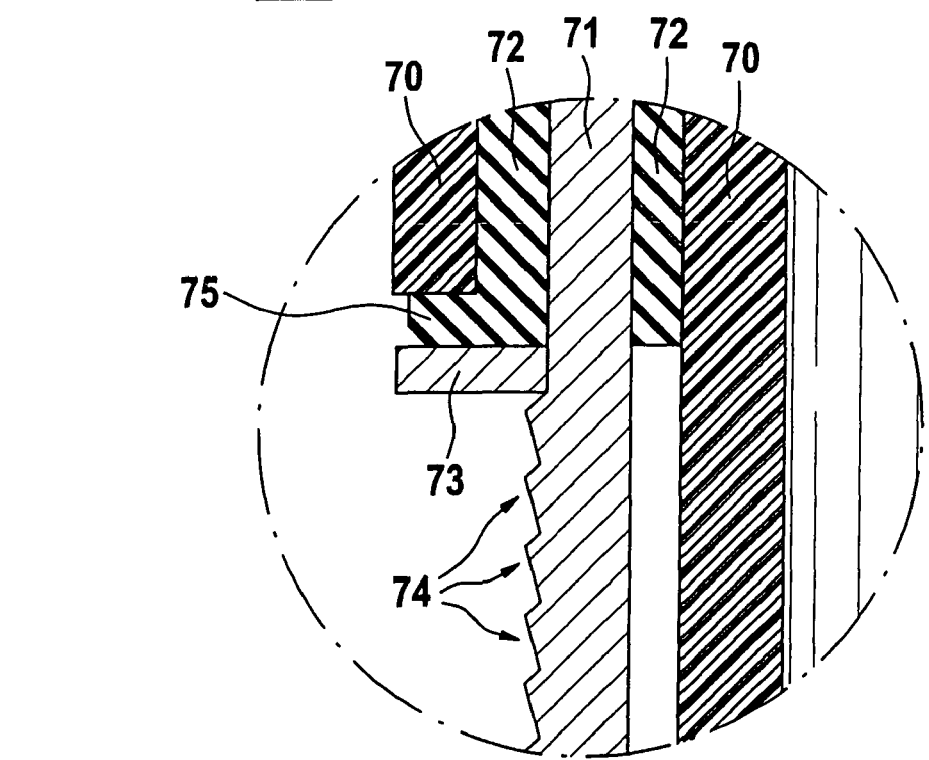
FIG. 8 A detailed view of a detail in the end area of a wiper bearing from FIG. 7.

FIGS. 7 and 8 show a windshield wiper device 700 with a wiper bearing 70, a fastening element 71 and a decoupling element 72. A disk 73 is arranged between the decoupling element 72 and the fastening element 71. Teeth 74 arranged one after another extend beneath the disk 73. In the case of an impact with a pedestrian, the wiper bearing 70 together with the decoupling element 72 and the disk 73 are displaced downward. During this displacement, the disk 73 is pushed over the successively arranged teeth 74 so that the impact force counteracts an increased frictional force. As a result, the impact energy is converted to thermal energy and therefore uniformly dissipated. The frictional force counteracting the impact force can be specified in accordance with the inclination of the flanks of the teeth 74.

The invention claimed is:

1. Windshield wiper device (100, 400, 500, 700) for a motor vehicle with at least one wiper bearing (12, 42, 50, 70) and a fastening element (14, 44, 51, 71) that is connected to a vehicle body, wherein a decoupling element (15, 43, 52, 72) for decoupling noise is arranged between the at least one wiper bearing (12, 42, 50, 70) and the fastening element (14, 44, 51, 71), characterized in that the decoupling element (15, 43, 52, 72) and/or the wiper bearing (12, 42, 50, 70) is detachably connected to the fastening element (14, 44, 51, 71), and in that fastening element (14, 44, 51, 71) and/or the decoupling element (15, 43, 52, 72) are provided with an undercut, and the fastening element (14, 44, 51, 71) and/or the decoupling element (15, 43, 52, 72) are manufactured of a deformable material, and in that the undercut is a material projection in an end area of the fastening element (14, 44, 51, 71), and in that the undercut is a hook-shaped end area (47, 55, 75) of the decoupling element (43, 52, 72), and in that a disk (53, 73) is arranged between the material projection in the end area of the fastening element (51, 71) and the hook-shaped end area (55, 75) of the decoupling element (52, 72), and in that the undercut on the fastening element (44, 51, 71) features a diagonal bearing surface on which the disk (53, 73) or the decoupling element (43) rests.

2. Windshield wiper device (400, 500) according to claim 1, characterized in that the material projection in the end area of the fastening element (44, 51) is embodied as a thickening (45, 54).

3. Windshield wiper device (700) according to claim 1, characterized in that the material projection in the end area of the fastening element (71) features several teeth (74) arranged one after the other.

4. Windshield wiper device (100, 400, 500, 700) according to claim 1, characterized in that there is a displacement path (15) between a wiper arm (10) and the fastening element (14, 44, 51, 71) in case of an impact with the windshield wiper device (100, 400, 500, 700).

5. Windshield wiper device (100, 400, 500, 700) according to claim 4, characterized in that the decoupling element (15, 43, 52, 72) is manufactured of a plastic, in particular an elastomer.

6. Windshield wiper device (100, 400, 500, 700) according to claim 5, characterized in that the fastening element (14, 44, 51, 71) is manufactured of a plastic.

7. Windshield wiper device (100, 400, 500, 700) according to claim 6, characterized in that at least one wiper bearing and/or the fastening element (14, 44, 51, 71) and/or the decoupling element (15, 43, 52, 72) are non-variable parts.

8. Windshield wiper device (100, 400, 500, 700) according to claim 1, characterized in that the decoupling element (15, 43, 52, 72) is manufactured of a plastic, in particular an elastomer.

9. Windshield wiper device (100, 400, 500, 700) according to claim 1, characterized in that the fastening element (14, 44, 51, 71) is manufactured of a plastic.

10. Windshield wiper device (100, 400, 500, 700) according to claim 1, characterized in that at least one wiper bearing and/or the fastening element (14, 44, 51, 71) and/or the decoupling element (15, 43, 52, 72) are non-variable parts.

* * * * *